(12) United States Patent
Matsui et al.

(10) Patent No.: US 6,353,300 B1
(45) Date of Patent: Mar. 5, 2002

(54) OPEN ROOF OPERATING METHOD AND OPEN ROOF OPERATION CONTROL SYSTEM

(75) Inventors: Seika Matsui, Chiryu; Yoshihiro Nakamura, Nagoya; Tatsumi Tashiro; Shinji Suganuma, both of Toyota; Junkoh Shima, Nisshin, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/686,980

(22) Filed: Oct. 17, 2000

(30) Foreign Application Priority Data

Oct. 19, 1999 (JP) .............................. 11-297424

(51) Int. Cl.$^7$ ................................. B60J 7/00
(52) U.S. Cl. ................... 318/466; 296/107.08
(58) Field of Search ................ 318/101, 102, 318/445, 466, 468; 296/107.08

(56) References Cited

U.S. PATENT DOCUMENTS

| | | | |
|---|---|---|---|
| 5,110,175 A | * 5/1992 | Fischbach | 296/117 |
| 5,225,747 A | 7/1993 | Helms et al. | 318/265 |
| 5,451,849 A | * 9/1995 | Porter et al. | 318/466 |
| 5,620,226 A | * 4/1997 | Sautter, Jr. | 296/107 |
| 5,724,878 A | * 3/1998 | Stolle et al. | 91/165 |
| 5,755,467 A | * 5/1998 | Dilluvio et al. | 292/32 |

FOREIGN PATENT DOCUMENTS

| | | |
|---|---|---|
| DE | 44 46 483 | 6/1996 |
| JP | 8-199906 | 8/1996 |
| JP | 8-230484 | 9/1996 |
| JP | 10-58984 | 3/1998 |

* cited by examiner

*Primary Examiner*—Bentsu Ro
(74) *Attorney, Agent, or Firm*—Burns, Doane, Swecker & Mathis, LLP

(57) ABSTRACT

In an open roof operating method, when a pulse of a value equal to or greater than a set value is inputted to an ECU when the outputting of motors is stopped, simultaneous operations of respective components are stopped. By adding a sequential non-interference operation flow to a simultaneous operation flow, the interference among respective components under specific conditions can be obviated.

4 Claims, 2 Drawing Sheets

OPEN ROOF OPERATING METHOD AND OPEN ROOF OPERATION CONTROL SYSTEM

BACKGROUND OF THE INVENTION

The present invention relates to an open roof operating method and an open roof operation control system applicable to a convertible vehicle.

A convertible car such as an open car which is capable of storing or housing a roof panel (a roof portion) and a rear window (a rear window portion) in the inside of a luggage space (a trunk room) has been well known. As shown in FIG. 2, this type of vehicle ensures each movement of a roof panel 1, a rear window 2, a package tray 3 and a luggage panel.

FIG. 2(a) shows a state in which the roof panel 1 and the rear window 2 are held at a closed position. To bring this closed position into an open state shown in FIG. 2(e) indicating an opened position, first of all, the rear window 2 is erected and is turned down in the rearward direction so as to move the roof panel 1 connected to the rear window 2 in the rearward direction while maintaining its horizontal posture. Here, the luggage panel 4 is made to open a front portion thereof about a pivot point 5 (see FIG. 2(b)).

The further turning down of the rear window 2 in the rearward direction brings about the interference between the package tray 3 and the roof panel 1 which moves in the rearward direction. Accordingly, as shown in FIG. 2(c), the package tray 3 is erected in the frontward direction so as to prevent the interference between the roof panel 1 and the package tray 3 by enlarging a space between the package tray 3 and the luggage panel 4.

Under the condition shown in FIG. 2(c), after confirming that the roof panel 1 and the rear window 2 are completely stored or housed in a luggage space 6, a slide board 7 of the package tray 3 is pulled out in the rearward direction and the package tray 3 is turned down in the rearward direction (a fully closed position of the package tray 3) (see FIG. 2(d)).

After confirming the full closure position of the package tray 3 (the roof panel 1 opened), the luggage panel 4 is fully closed (see FIG. 2(e)).

To bring the open state, that is, the fully opened state shown in FIG. 2(e) into the fully closed state shown in FIG. 2(a), the above-mentioned operation is performed in an opposite manner.

In the roof fully closed state shown in FIG. 2(a), to put a luggage into the inside of the luggage space 6, a lock between the luggage panel 4 and a vehicle body is released. Then a rear portion of the luggage panel 4 is lifted so as to open the luggage panel 4 in the rearward direction.

An example of the movement of the above-mentioned roof panel and the luggage panel is disclosed in Japanese Patent Laid-open Publication No. 230484/1996 and an example of the movement of the above-mentioned package tray is disclosed in German Patent Specification No. 4446483. In these known examples, an approximately U-shaped auxiliary frame is disposed in the inside of a luggage space at a rear portion of a vehicle and support plates are fixedly secured to end portions of opposing legs of this auxiliary frame. A luggage panel is held on the support plates by way of a swingable parallelogram link mechanism, thereby the luggage panel can be opened in the frontward direction.

The frontward opening of the luggage panel is performed by rotating the luggage panel about a support pipe of the auxiliary frame extending in the vehicle widthwise direction together with the support plates and the parallelogram link mechanism while being assisted by a hydraulic cylinder. Here, a rear portion of the luggage panel is locked to the support pipe of the auxiliary frame by means of a locking device.

When the roof panel is fully opened or fully closed, the package tray 3 closes an opening portion formed between a front periphery of the luggage panel and a vehicle body so as to perform the function of preventing the exposure of the luggage space.

Examples of the package tray are shown in French Patent Specification No. 2747077 (corresponding to Japanese Patent Laid-open Publication No. 58984/1998) and said German Patent Specification No. 4446483. The former is constituted such that it includes a slide board slidable relative to a main board and side boards disposed at both sides of the slide board, wherein the side boards are tilted and erected upwardly when the roof panel is fully closed. The latter is constituted such that it includes a slide panel slidable relative to a main board and side boards disposed at both sides of the slide board, wherein the side boards are stored or housed on the main board when the roof panel is fully closed.

As has been explained above, the operation of the conventional open roof is performed sequentially such that a storage lid such as the luggage panel or the package tray is opened, the roof panel is stored, and then the storage lid is closed. However, in such a manner of operation, the operation time becomes equal to or more than the sum of operation times of respective components. In this manner, the operation is a time consuming operation and hence is undesirable. To shorten this operation time, although it may be possible to operate respective components simultaneously, means which obviates the collision, that is, the interference among respective components becomes necessary.

Japanese patent Laid-open Publication No. 171372/1994 discloses the simultaneous operations of a roof panel and an open/close lid which constitutes a luggage panel. However, since the position of the roof panel is detected by a shaft of a final drive stage of a link mechanism for opening and closing the roof panel, the position accuracy necessary for the simultaneous operations cannot be achieved. Accordingly, to avoid the interference among respective components, it becomes necessary to increase the distance flexibility among respective components.

On the other hand, Japanese Patent Laid-open Publication No. 199906/1996 proposes the detection of positions of respective components by making use of pulse signals synchronized with the rotation of motors for respective components. However, in this proposal, even when a power supply is in the OFF-state, it is necessary to monitor pulses. This is contradictory to an idea to suppress the power consumption when the power supply is in the OFF-state and, in fact, it is impossible to monitor pulses during the exchange of a battery. Accordingly, the application of this proposal to actual vehicles is considered unsuitable. In addition, when respective components are operated manually, it becomes necessary to provide means for making a user understand the rotational directions and the rotational amounts of respective motors. This pushes up the cost.

The present invention has been made in view of the above and it is an object of the present invention to provide an operation method of an open roof and an open roof operation control system which can overcome the above-mentioned drawbacks of the conventional art.

SUMMARY OF THE INVENTION

To solve the above-mentioned drawbacks, the present invention substantially adopts motors which drive respective components comprising a roof panel and at least one of storage lids such as a luggage panel and a package tray, pulse signal means which generates pulses in synchronous with the rotation of at least the motor for driving the roof panel, and means which performs the simultaneous operations of respective components using control means for controlling respective motors and stops the simultaneous operations when the position information obtained from pulse signals is not reliable and changes over the simultaneous operations to non-interference operations which are sequential operations.

The state that the position information obtained from the pulse signals is not reliable includes, for example, a state in which a pulse with an uncertain motor rotating direction is inputted by moving the component with a hand when a power supply is in the OFF-state, a state in which a plurality of pulse signals are abnormally inputted and the like.

To be more specific, the condition to become the non-interference operation (non-simultaneous operation prohibiting the simultaneous operation) is that the pulse information is unreliable. Following cases are considered to be the conditions to become the non-interference operation.

1. The roof panel is not fully opened or closed when the ignition is in the ON-state.

(When the ignition is in the OFF-state, a controller (control means) is not monitoring the pulses and hence, the relevance between the positions of respective components and pulse information is cut so that the pulse information is not reliable.)

2. When there is no output from the controller to the motors, pulses exceeding a set amount are inputted to the controller.

(This refers to a case in which the position of the component is changed due to an external force such as a manual operation or the like. In this case, since the moving direction and the moving amount are not determined, the pulse information is not reliable.)

3. The correlation between a plurality of pulse information which are set as a redundancy system is abnormal.

(Example 1: a plurality of pulse information set for detecting abnormalities such as the destruction of memory or the like in the inside of the controller.

Example 2: pulse information on respective left and right motors for driving the roof panel with these motors.)

4. The pulse information is not within a range that pulse information can be obtained by usual operations of the components.

(Example 1: The pulse information indicates the operations outside the movable range of the components (the roof, the storage lid (the luggage panel, the package tray) and the like).

Example 2: The relationship between the pulse information and other position information source (the position detection switches indicating stop positions of components, the motor lock current indicating the stop of motors or the like) is not normal.

BRIEF DESCRIPTION OF THE DRAWINGS

FIG. 2(a) to FIG. 2(e) are explanatory views showing the motion (the simultaneous operation) of a roof panel, a rear window, a luggage panel and the like.

DETAILED DESCRIPTION OF THE PREFERRED EMBODIMENTS

Figure 1:
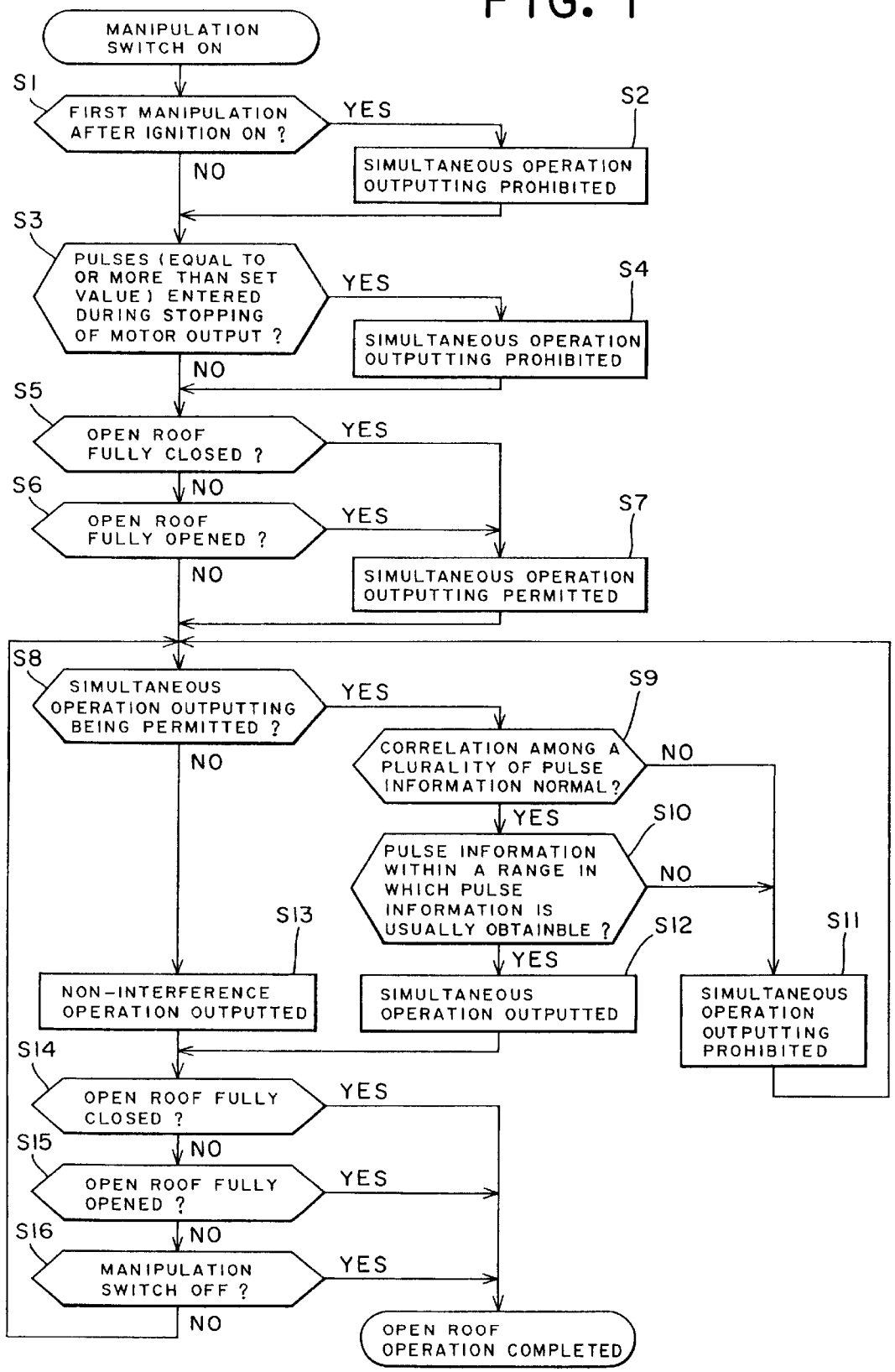
FIG. 1 is a flow chart showing the changeover between the simultaneous operation and the non-interference operation in an open roof operating method of the present invention.

A control program for changing over the simultaneous operation and the non-interference operation of the open roof operating method of the present invention is explained in conjunction with FIG. 1.

This control program shows the operation of an ECU (not shown in the drawings) to which a drive circuit (not shown in the drawings) of motors which become drive sources of a roof panel 1 and a link mechanism (not shown in the drawings) for performing an opening-closing operation of a rear window 2 (an open roof), luggage panel 4 and a package tray 3 is electrically connected by way of an output interface (not shown in the drawings).

Further, Hall ICs which output pulse signals in response to (or in synchronous with) the rotational speeds of respective motors are electrically connected to the ECU by way of an input interface (not shown in the drawing). Further, various switches including an ignition switch, an opening-closing manipulation switch, position detection switches and the like are electrically connected to the ECU by way of the input interface.

This flow chart merely constitutes one example and it should be understood that various flow charts can be made by changing the order of conditions and the like or combining the conditions.

Following an ON operation of the manipulation switch (an opening operation or a closing operation of the open roof), it is judged whether the ON operation is the first manipulation after an ignition ON operation or not (step S1). If the judgment is "YES", namely affirmative (first manipulation), since there is a possibility that the pulse signals from respective Hall ICs of respective motors are not reliable, the outputting of a command for the simultaneous operation is prohibited (step S2). If the judgement is "NO", namely negative in the step S1, it is judged whether pulses (equal to or greater than the set value) are fed to the ECU during a period that the outputting of motors is stopped or not (step S3).

If the judgement is affirmative (pulse signals from the Hall ICs are inputted to the ECU during a period that the outputting of motors is stopped) in the step S3, since there is a possibility that the pulse signals from respective Hall ICs of respective motors are not reliable, the outputting of a command for the simultaneous operation is prohibited (step S4).

If the judgement is negative in the step S3, it is judged whether the open roof is fully closed or fully opened (steps S5 and S6). If the judgement is affirmative (the open roof is fully opened or closed), the outputting of a command for the simultaneous operation is permitted (step S7).

In the step S1, when the manipulation is a manipulation which is performed first time after the ignition ON operation, the simultaneous operation is prohibited. Under such a condition, only when the open roof is fully opened or fully closed, the simultaneous operation is permitted (In these two states, the positions of respective components can be confirmed and these positions can be reflected as pulse information.). Further, in the step S3, when the condition is established, the operation is also once prohibited and then is permitted when the open roof is fully opened or fully closed.

If the judgement in the step S6 is negative, it is judged whether the simultaneous operation output is being permitted or not in step S8. Subsequently, it is judged whether the correlation among a plurality of pulse information is normal or not (step S9) and then it is judged whether the pulse information is within a range in which the information is obtainable under the usual operating conditions or not (step S10). If these judgments are negative (the correlation is abnormal or the pulse information is out of the range), since the pulse signals from the Hall ICs from respective motors are not reliable, the outputting of a command for the simultaneous operation is prohibited (step S11). On the other hand, if these judgements are affirmative, the outputting of a command for the simultaneous operation is calculated (step S12).

Figure 2A:
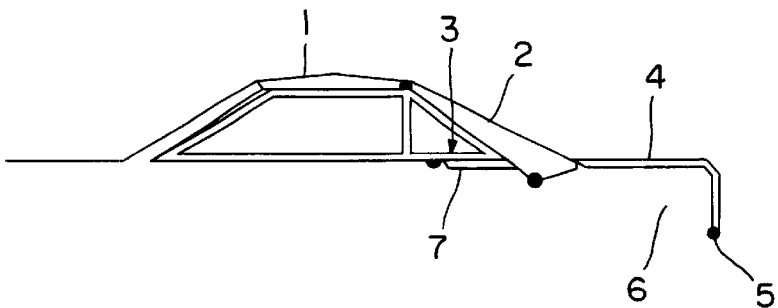
Figure 2B:
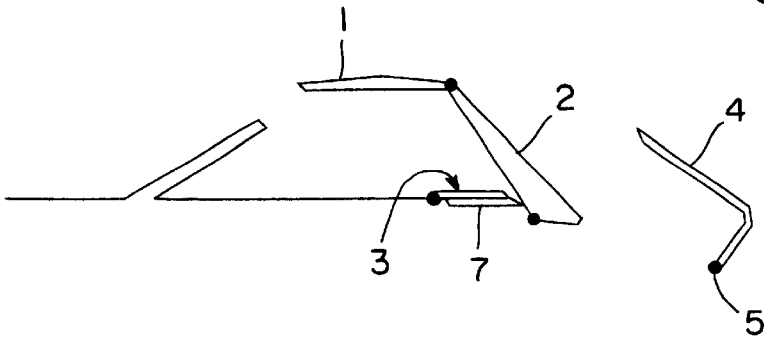
Figure 2C:
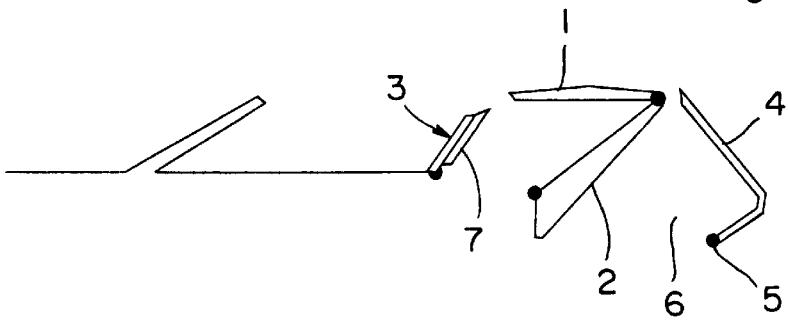
Figure 2D:
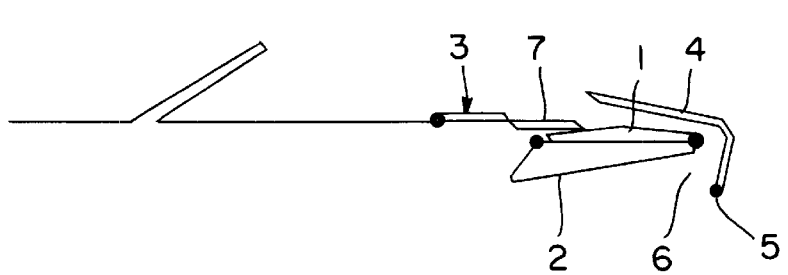
Figure 2E:
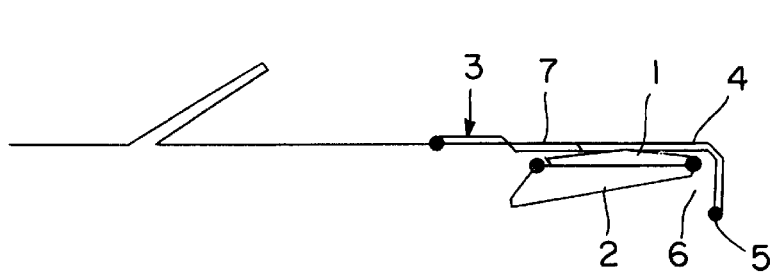

The simultaneous operation outputting means that opening-closing operations of the roof panel 1, the back window 2, the luggage panel 4 and the package tray 3 shown in FIG. 2(b), FIG. 2(c) and FIG. 2(d) are simultaneously performed.

If the judgement in the step S6 is negative, the outputting of a command for the non-interference operation (non-simultaneous operation) is performed (step S13). In the non-interference operation, as shown in FIG. 2(b), FIG. 2(c) and FIG. 2(d), after completion of the opening-closing operation of the luggage panel 4, the opening-closing operations of the roof panel 1 and the back window 2 are performed so as to bring the roof panel 1 and the back window 2 to given positions. Thereafter, the opening-closing operation of the package tray 3 is performed.

If the judgement made in any one of step S14, step S15 and step S16 is affirmative (the open roof is fully closed or fully opened or the manipulation switch is in the OFF state), the simultaneous operation or the non-interference operation is finished. It may be possible to modify the flow such that when the operation is again switched on after the manipulation switch is switched off, the non-interference operation outputting in the step S13 is performed. In the step S9 and the step S10, even if the simultaneous operation is currently under way, if the conditions are established, the simultaneous operation is prohibited.

The simultaneous operation of the roof panel 1, the back window 2, the luggage panel 4 and the package tray 3 can adopt various combinations of components such as the combination of the roof panel 1, the back panel 2 and the luggage panel 4, the combination of the roof panel 1, the back panel 2 and the package tray 3, and the combination of the package tray 3 and the luggage panel 4.

As many apparently widely different embodiments of the present invention can be made without departing from the spirit and scope thereof, it is to be understood that the invention is not limited to the specific embodiments thereof except as defined in the appended claims.

What is claimed is:

1. An open roof operating method characterized in that a simultaneous operation mode in which opening-closing operations of at least two of a roof panel, a luggage panel and a package tray are simultaneously performed is changeable to a non-simultaneous operation mode in which opening-closing operations of at least two of the roof panel, the luggage panel and the package tray are performed non-simultaneously and sequentially by prohibiting the simultaneous operation mode.

2. An open roof operating method according to claim 1, wherein the simultaneous operation mode is performed in response to position signals from position detection means which detects opening-closing positions of at least two of the roof panel, the luggage panel and the package tray which are subjected to the opening-closing operations under the simultaneous operation mode and the simultaneous operation mode is prohibited when there is an abnormality in the position signal from the position detection means.

3. An open roof operation control system comprising:

simultaneous operation means for simultaneously performing opening-closing operations of at least two of a roof panel, a luggage panel and a package tray, non-simultaneous operation means for non-simultaneously and sequentially performing the operations of at least two of the roof panel, the luggage panel and the package tray which are subjected to the opening-closing operation based on the simultaneous operation means, and switching means for changing over the simultaneous operation means and the non-simultaneous operation means.

4. An open roof operation control system according to claim 3, wherein the switching means is capable of judging whether position signals transmitted from position detection means for detecting opening-closing positions of at least two of the roof panel, the luggage panel and the package tray which are subjected to the opening-closing operation based on the simultaneous operation means are reliable or not so as to change over the simultaneous operation means and the non-simultaneous operation means.

* * * * *